(12) United States Patent
Mueller et al.

(10) Patent No.: US 10,040,496 B2
(45) Date of Patent: Aug. 7, 2018

(54) METHOD FOR INSTALLING AN ADD-ON PART ON A VEHICLE BODY

(71) Applicant: Siemens Aktiengesellschaft, Munich (DE)

(72) Inventors: Patrick Mueller, Drognitz (DE); Horst Ziermann, Rudolstadt (DE)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 15/039,566

(22) PCT Filed: Nov. 13, 2014

(86) PCT No.: PCT/EP2014/074446
§ 371 (c)(1),
(2) Date: May 26, 2016

(87) PCT Pub. No.: WO2015/078696
PCT Pub. Date: Jun. 4, 2015

(65) Prior Publication Data
US 2017/0174279 A1     Jun. 22, 2017

(30) Foreign Application Priority Data
Nov. 28, 2013 (EP) .................................... 13194840

(51) Int. Cl.
    *B62D 65/02*     (2006.01)
    *B62D 65/06*     (2006.01)
    *B23Q 3/18*     (2006.01)

(52) U.S. Cl.
    CPC ............. *B62D 65/06* (2013.01); *B23Q 3/186* (2013.01); *B62D 65/028* (2013.01);
(Continued)

(58) Field of Classification Search
    CPC .... B62D 65/06; B62D 65/028; B62D 65/026; B62D 65/024; Y10T 29/49769;
(Continued)

(56) References Cited

U.S. PATENT DOCUMENTS 4,961,257 A * 10/1990 Sakamoto .............. B62D 65/06
    29/822
5,150,506 A * 9/1992 Kotake .................. B62D 65/02
    29/407.05
(Continued)

FOREIGN PATENT DOCUMENTS

DE      37 26 292      2/1989
DE      10 026 192      11/2001
(Continued)

*Primary Examiner* — Jermie Cozart
(74) *Attorney, Agent, or Firm* — Cozen O'Connor (57) ABSTRACT

An add-on part on a vehicle body, where a plurality of body hinge halves are each installed on the vehicle body using a first reference point system comprising body reference points, at least one vehicle transverse axis coordinate of the installed body hinge halves is measured, a plurality of add-on part hinge halves are each installed on the add-on part by using the first reference point system and a second reference point system comprising add-on part reference points, at least one correction value for the add-on part hinge halves with regard to the transformed arrangement of the add-on part hinge halves in the vehicle transverse axis is determined from the measured vehicle transverse axis coordinate of the body hinge halves, and the at least one correction value is used in the installation of the add-on part hinge halves.

10 Claims, 5 Drawing Sheets

(52) U.S. Cl.
CPC ........ *B23P 2700/50* (2013.01); *B62D 65/024* (2013.01); *B62D 65/026* (2013.01); *Y10T 29/4978* (2015.01); *Y10T 29/49771* (2015.01); *Y10T 29/49778* (2015.01); *Y10T 29/49998* (2015.01)

(58) Field of Classification Search
CPC ........... Y10T 29/4978; Y10T 29/49778; Y10T 29/49771; Y10T 29/49998; Y10T 29/49904; Y10T 29/53052; B23P 2700/50; B25B 11/005; B23Q 3/186
See application file for complete search history.

(56) References Cited

U.S. PATENT DOCUMENTS

| | | | | |
|---|---|---|---|---|
| 2002/0023334 | A1* | 2/2002 | Rhoads | B62D 65/06 29/434 |
| 2002/0144388 | A1* | 10/2002 | Mercier | B62D 65/06 29/407.01 |
| 2002/0170160 | A1* | 11/2002 | Savoy | B62D 65/06 29/407.1 |
| 2003/0051328 | A1* | 3/2003 | Song | B62D 65/06 29/428 |
| 2004/0034984 | A1* | 2/2004 | Aoki | B62D 25/04 29/525.01 |
| 2005/0055824 | A1* | 3/2005 | Jung | B62D 65/06 29/719 |
| 2012/0017413 | A1* | 1/2012 | Carter | B62D 65/06 29/428 |
| 2014/0165360 | A1 | 6/2014 | Mangiarino | |

FOREIGN PATENT DOCUMENTS

| | | |
|---|---|---|
| DE | 10 347 554 | 5/2005 |
| DE | 10 356 808 | 7/2005 |
| DE | 10 2006 048 030 | 4/2008 |
| EP | 2 409 810 | 1/2012 |
| EP | 2 463 182 | 6/2012 |
| EP | 2 423 639 | 3/2013 |
| WO | WO 9636525 A1 | 11/1996 |
| WO | WO 2007/003375 | 1/2007 |
| WO | WO 2008/043685 | 4/2008 |

* cited by examiner

METHOD FOR INSTALLING AN ADD-ON PART ON A VEHICLE BODY

CROSS-REFERENCE TO RELATED APPLICATIONS

This is a U.S. national stage of application No. PCT/EP2014/074446 filed 13 Nov. 2014. Priority is claimed on European Application No. 13194840.8 filed 28 Nov. 2013, the content of which is incorporated herein by reference in its entirety.

BACKGROUND OF THE INVENTION

1. Field of the Invention

The present invention relates to add-on parts for a vehicle body and, more particularly, to a method for installing an add-on part on the vehicle body.

2. Description of the Related Art

In conventional methods for robot-guided automatic installation of add-on parts on vehicle bodies, a vehicle body is initially moved by a conveyor system into a production area, into which the add-on parts are also supplied via storage equipment or containers. Add-on parts include, for example, engine hoods, tailgates, wings or doors. During installation of the add-on part, add-on parts are removed from a respective container by a robot and installed on the vehicle body.

DE 37 26 292 C1 describes a method for installing vehicle doors having a door body forming a load-bearing structure, in the cavity of which a unit carrier fixed to the door body is arranged to hold door internal assemblies. Here, the door body without unit carrier is first inserted with an accurate fit into door openings on the body that are provided for this purpose. After that, the door body that is used is detected by performing measurements at defined measuring points. Measured values determined in the process are related to further measured values that are determined at measuring points on the body in an area of the door pillar and roof frame. The door body is then dismounted and transported to a door installation station. There, the vehicle door is completed by installing the unit carrier and further internal fittings, with the aid of a door installation device using the measured results at the measuring points. Finally, renewed installation of the completed vehicle door is performed on the vehicle further finished in the meantime in parallel operations.

WO 1996/036525 discloses a method for the automatic installation of a component of a motor vehicle body, in which the motor vehicle body is measured automatically before installation of the component. After that, a necessary installation position of the component is determined and an installation device installing the installation part is controlled appropriately. Following the installation of the installation part, an actual position of the component in relation to the motor vehicle body is again measured. Correction data for the installation of the corresponding component of the following motor vehicle body is obtained from the determined position of the installed component.

DE 103 47 554 A1 describes a method for installing a body part on a body, in which an installation device provided with drivable actuators is used. Here, the installation device has a holder for the body part. After the body part has been picked up by the holder, a measuring position of the body part on the body is approached and alignment and gap dimensions are measured by optical measuring sensors at a plurality of measuring points as actual values. The actual values are then compared with predefined reference values and correction values are determined. The installation device is respectively moved by the correction values until the actual values coincide with the reference values. The body part is finally fixed to the body.

WO 2007/003375 A1 discloses a method for joining a first joining structure and a second joining structure, in which an accurately contoured model of the first joining structure and the second joining structure are positioned in relation to each other in a joining position. The model and the second joining structure are measured relative to each other for fitting accuracy in the joining position. Depending on the measurement, a connecting device for the accurately fitting connection of the joining structures is produced on or fixed to the second joining structure.

DE 10 2006 048030 A1 describes a method for determining at least one gap dimension assigned to two contours, in which a three-dimensional image of a region with the gap to be examined is produced. Measured values of contours determining the gap are then smoothed. Starting from a first measuring point on one of the smoothed contours, at a measuring point for which the gap dimension is to be determined, a second measuring point on the respective other smoothed contour is determined in accordance with a stored instruction. The gap dimension sought is determined between the two measuring points. In order to produce the three-dimensional image, a projector projects encoded light onto a region to be imaged. A camera records this region in a color or gray value image, from which a topographic image is generated with the aid of triangulation.

EP 2 423 639 B1 discloses a method for determining gap dimension or flushness of body parts of a motor vehicle, in which body parts to be aligned in relation to one another are scanned three-dimensionally in a multiplicity of predefinable measuring areas, each via a scanning device. Here, a 3-D surface profile of the body parts is measured as objects to be measured. The measuring areas are configured so as to be vehicle-specific. The scanning devices are aligned with at least one body joint by using a predefined vehicle-specific configuration. From scanning values acquired via the scanning devices, three-dimensional surface elements to be assigned to the body parts to be aligned are determined within the measuring areas. Here, three-dimensional surface elements assigned to the body parts to be aligned within the measuring areas are identified from scanned values acquired via the scanning devices. For each of the three-dimensional surface elements determined, position and orientation in space are determined. From type, position and orientation of at least two adjacent three-dimensional surface elements, gap dimension and flushness for at least two body parts to be aligned with each other are determined.

SUMMARY OF THE INVENTION

It is an object of the present invention to provide a method for installing an add-on part on a vehicle body which can be used without vehicle type-specific installation devices for a multiplicity of different vehicle types and which permits reduced installation execution times.

This and other objects and advantages are achieved in accordance with the invention by the method of the invention for installing an add-on part on a vehicle body, where a plurality of body hinge halves are each installed on the vehicle body using a first reference point system comprising body reference points. The body hinge halves are each defined with regard to their arrangement in the vehicle longitudinal and vertical axes of the vehicle by the reference point system. A pivot axis of the add-on part is defined by hinge holes or hinge bolts of the body hinge halves.

Furthermore, at least one vehicle transverse axis coordinate of the installed body hinge halves is measured. A plurality of add-on part hinge halves are each installed on the add-on part using the first reference point system and a second reference point system comprising add-on part reference points. The add-on part hinge halves are each defined with regard to their transformed arrangement in the vehicle longitudinal vertical axes of the vehicle by the second reference point system. In this connection, for example, a reference to a finally installed, closed state of the add-on part can be subsumed in a transformed arrangement.

In accordance with the invention, at least one correction value for the add-on part hinge halves with regard to their transformed arrangement in the vehicle transverse axis is determined from the measured vehicle transverse axis coordinate of the body hinge halves. The add-on part hinge halves are installed by using the determined correction value. Furthermore, the add-on part is moved via a positioning device to a measuring position at a predefinable distance from the vehicle body. At the measuring position, the position and orientation of hinge bolts or hinge holes of the add-on part hinge halves are determined and are compared with the position and orientation of corresponding hinge holes or hinge bolts of the body hinge halves. By using a comparison result, the add-on part is suspended by the positioning device with its add-on part hinge halves on the body hinge halves installed on the vehicle body.

Based on a definition of the arrangement of the add-on part in relation to the vehicle body via coordinated positioning of the body hinge halves and the add-on part hinge halves, the measurement of the add-on part on the vehicle body with regard to gap dimension and flushness and any possibly required correction of the arrangement can be dispensed with. This results in a considerable time saving. Add-on part hinge installation positions on the add-on part are defined by the second reference point system. As a result, it is not necessary for the positioning device to pick up the add-on part highly precisely. For this reason, in principle, a universal positioning device can be used for a plurality of different vehicle types.

For instance, the positioning device can comprise a suction gripper unit for picking up the add-on part and therefore can be equipped to pick up a multiplicity of different add-on parts. Preferably, the add-on part is picked up from a component storage device via the positioning device even before the installation of the add-on part hinge halves. In this way, the number of installation devices used can be minimized. This in turn results in reduced setup times. In accordance with a preferred embodiment of the present invention, the suction gripper unit is adjustable in the vehicle's longitudinal and vertical axes. Here, by adjusting the suction gripper unit in the vehicle longitudinal axis and in the vehicle vertical axis, a position of the add-on part in relation to the positioning device is defined. This facilitates specific positioning of the add-on part.

Preferably, in each case two (2) hinges are provided per add-on part. Here, before their installation, both body hinge halves are picked up jointly by a first gripper unit in accordance with the pivot axis of the add-on part and are positioned on the vehicle body in an installation position. In addition, before their installation, both add-on part hinge halves are preferably picked up jointly by a second gripper unit in accordance with the pivot axis of the add-on part and are positioned on the add-on part in an installation position. This permits rapid and accurate installation of the body hinge halves and add-on part hinge halves.

In accordance with an advantageous embodiment of the method in accordance with the invention, the body hinge halves are each installed on the vehicle body via a first screw inserted from a body inner side and a second screw subsequently inserted from a body outer side. As compared with primary external screw fixing, this permits reduced loading on the body hinge halves and therefore a reduced danger of de-adjustment of the body hinge halves during their installation on the vehicle body. The add-on part hinge halves are preferably each mounted on the add-on par with exactly one screw introduced from the outside.

In accordance with a particularly preferred embodiment of the method in accordance with the invention, the body hinge halves have hinge holes, while the add-on part hinge halves have hinge bolts. This permits a particularly simple suspension of the add-on part for installation on the vehicle body. Preferably, position and orientation of the installed body hinge halves are each scanned via a sensor arranged beside the vehicle body above an expected installation position. This permits a particularly reliable detection of the installation position of the body hinge halves. Advantageously, the position and orientation of the installed add-on part hinge halves are each scanned at the measuring position before suspension of the add-on part on the vehicle body via a sensor arranged beside/adjacent the vehicle body at the height of an expected measuring position. This permits a space-saving arrangement of the sensors for measuring the body hinge halves and add-on part hinge halves.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be explained in more detail below in an exemplary embodiment using the drawing, in which.

DETAILED DESCRIPTION OF THE EXEMPLARY EMBODIMENTS

Figure 1:
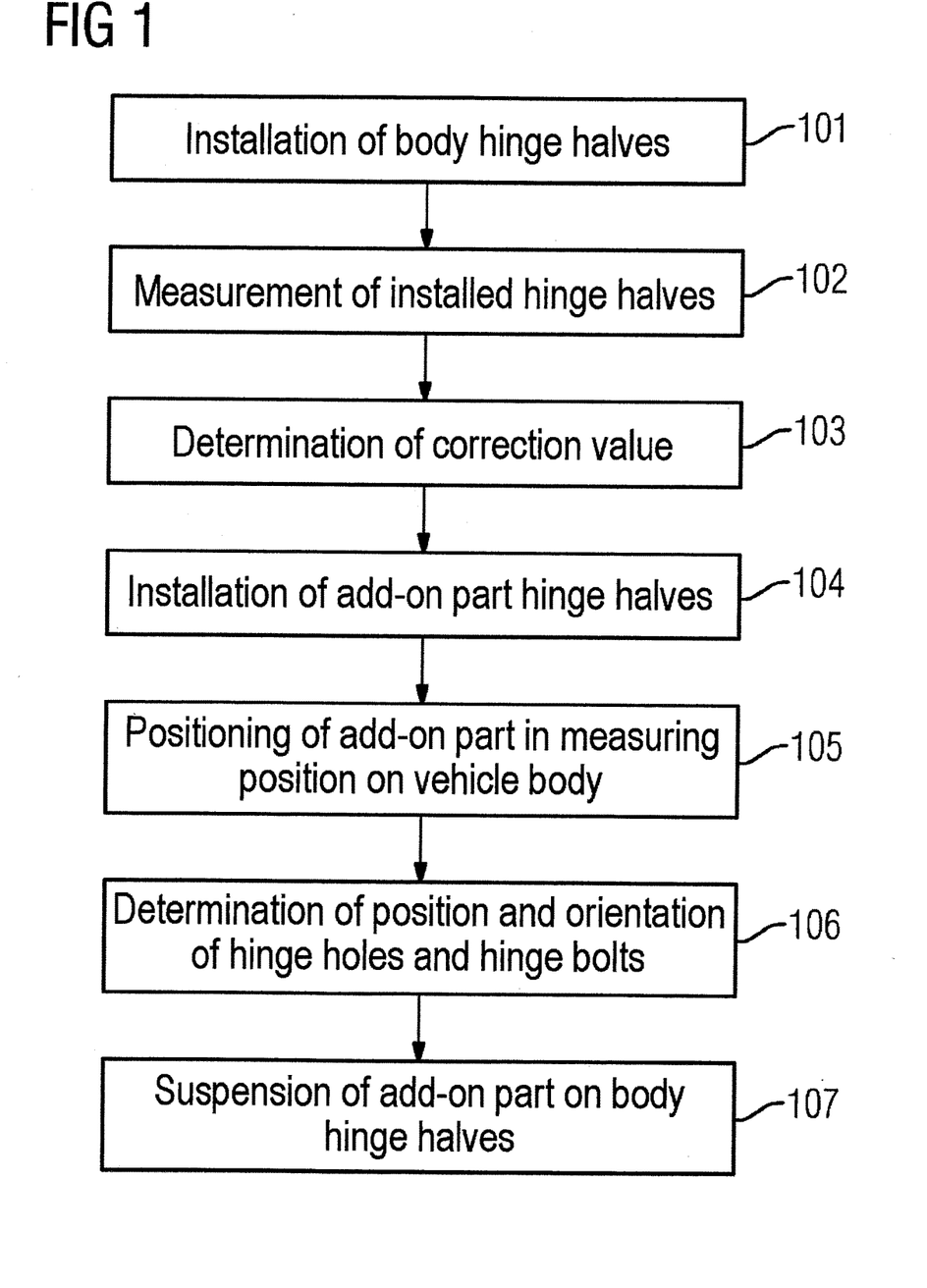
FIG. 1 shows a flowchart relating to the performance of a method for installing an add-on part on a vehicle body.

With reference to the flowchart illustrated in FIG. 1, in order to install an add-on part on a vehicle body, a plurality of body hinge halves are each initially installed on the vehicle body using a first reference point system comprising body reference points (step 101). The body hinge halves are each defined with regard to their arrangement in their vehicle longitudinal axis and in the vehicle vertical axis by the reference point system. Here, a pivot axis of the add-on part is defined by hinge holes or hinge bolts of the body hinge halves.

In accordance with step 102, at least one vehicle transverse axis coordinate of the installed body hinge halves is then measured. From the measured vehicle transverse axis coordinate of the body hinge halves, at least one correction value for associated add-on part hinge halves with regard to their transformed arrangement in the vehicle transverse axis is determined (step 103). A plurality of add-one part hinge halves are each then installed on the add-on part using the first reference point system and a second reference point system comprising add-on part reference points (step 104). The add-on part hinge halves are each defined with regard to their transformed arrangement in the longitudinal and vertical axes of the vehicle by the second reference point system. In addition, the add-on part hinge halves are installed by using the correction value determined, in accordance with step 103.

Following installation of the add-on part hinge halves, the add-on part is moved via a positioning device to a measuring position at a predefinable distance from the vehicle body (step 105). At the measuring position, in accordance with step 106, the position and orientation of hinge bolts or hinge holes of the add-on part hinge halves are determined and compared with the position and orientation of corresponding hinge holes or hinge bolts on the body hinge halves. Finally, by using a comparison result, the add-on part is suspended via the positioning device with its add-on part hinge halves on the body hinge halves installed on the vehicle body (step 107).

In the present exemplary embodiment, in each case two (2) hinges are provided per add-on part. Advantageously, before their installation, both body hinge halves are picked up jointly by a first gripper unit in accordance with the pivot axis of the add-on part and positioned on the vehicle body in an installation position. In a way analogous thereto, preferably before their installation, both add-on part hinge halves are picked up jointly by a second gripper unit in accordance with the pivot axis of the add-on part and are positioned on the add-on part in an installation position.

Figure 2:
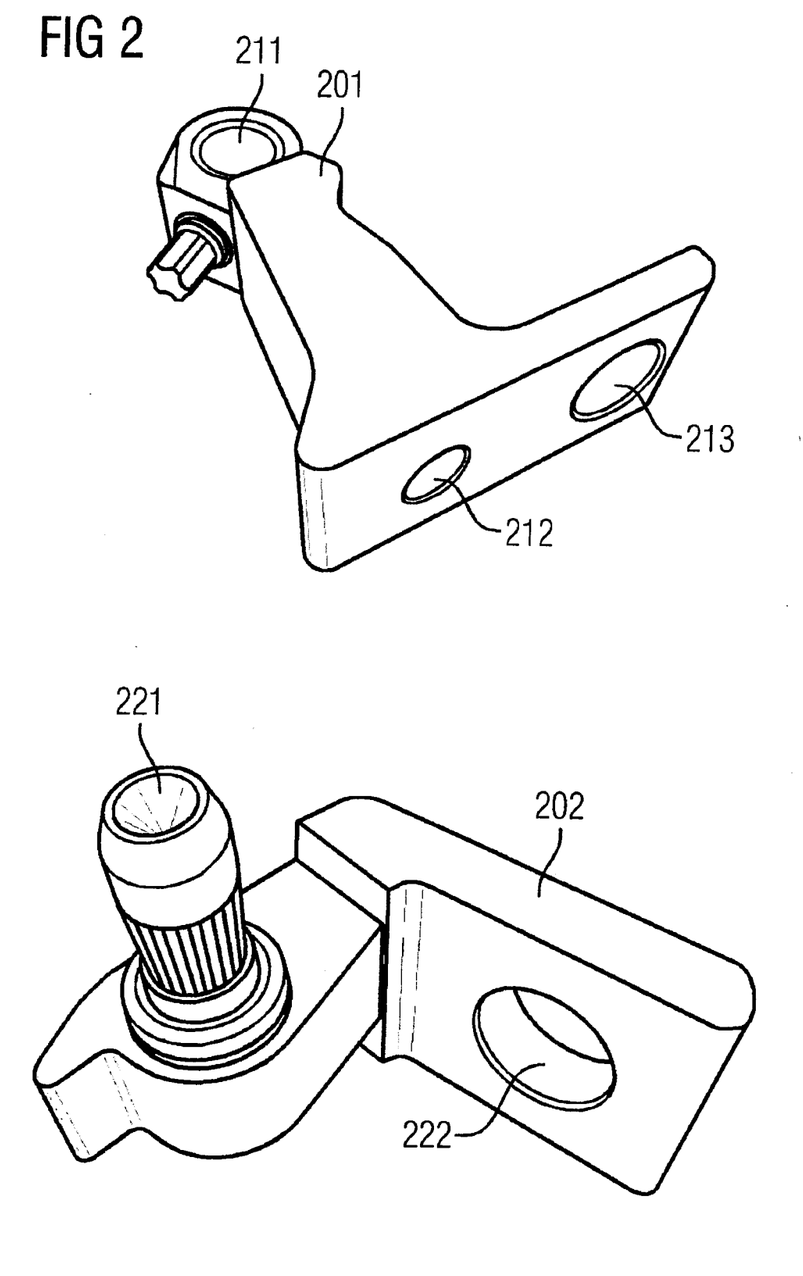
FIG. 2 shows a body hinge half and an add-on part hinge half.

In accordance with a preferred embodiment, the body hinge halves 201 have hinge holes 211, while the add-on part hinge halves 202 have hinge bolts 221. The body hinge halves 201 are each installed on the vehicle body via a first screw inserted from a body inner side and a second screw subsequently inserted from the body outer side. For the first screw, a threaded hole 212 is therefore provided on each of the body hinge halves 201, while the body hinge halves 201 each have a through hole 213 for the second screw. The add-on part hinge halves 202 are preferably each mounted on the add-on part via exactly one screw. To this end, the add-on part hinge halves 202 each have a through hole 222.

Figure 3:
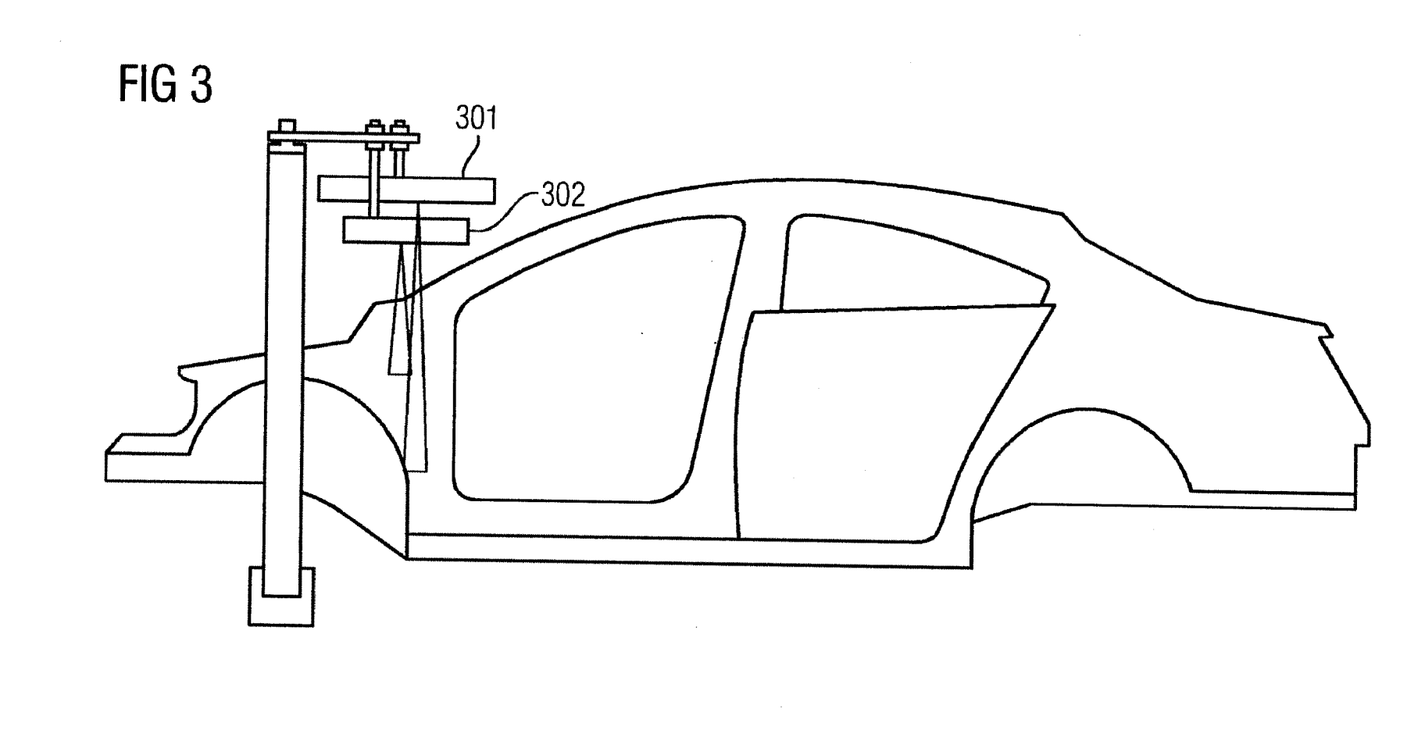
FIG. 3 shows an arrangement of sensors for sensing position and orientation of installed body hinge halves.

The arrangement shown in FIG. 3 of sensors for scanning position and orientation of installed body hinge halves, for a parallel acquisition of both body hinge halves, comprises a sensor 301, 302 respectively for scanning an associated hinge half. The position and orientation of the installed body hinge halves are each scanned by the sensor 301, 302 arranged beside the vehicle body above an expected installation position.

Figure 4:
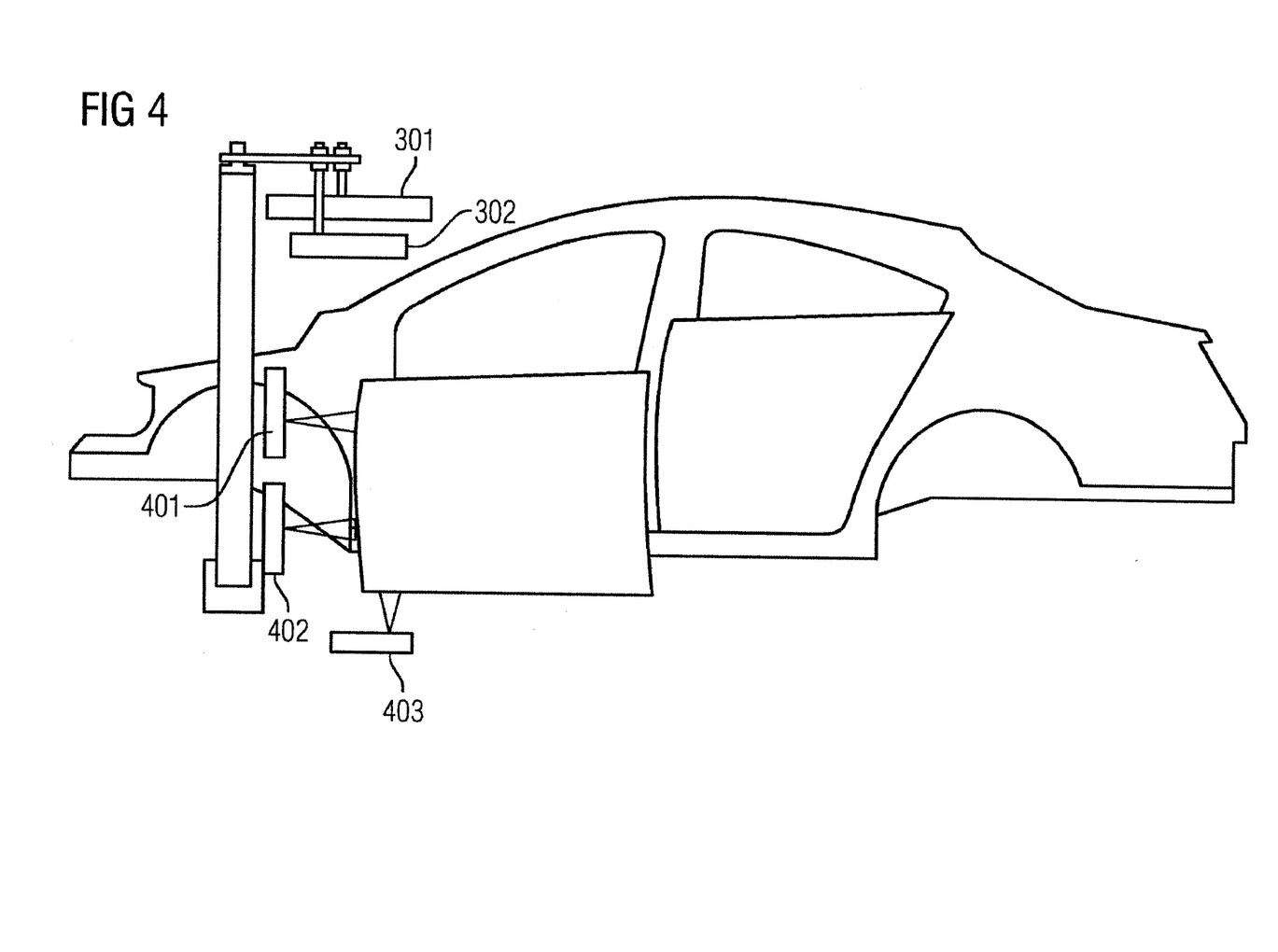
FIG. 4 shows an arrangement of sensors for sensing position and orientation of installed add-on part hinge halves.

As compared with the arrangement illustrated in FIG. 3, the arrangement of FIG. 4 is supplemented by sensors 401, 402, 403 for scanning position and orientation of installed add-on part hinge halves. For a parallel acquisition of both add-on part hinge halves, in each case a sensor 401, 402 for scanning an associated hinge half is provided. Position and orientation of the installed add-on part hinge halves at the measuring position before the suspension of the add-on part on the vehicle body are each scanned via the sensor 401, 402 arranged beside the vehicle body at the height of an expected measuring position. An additional sensor 403 is provided to scan a lower edge of the add-on part as a reference feature and, accordingly, is arranged at an expected measuring position underneath the vehicle body.

Figure 5:
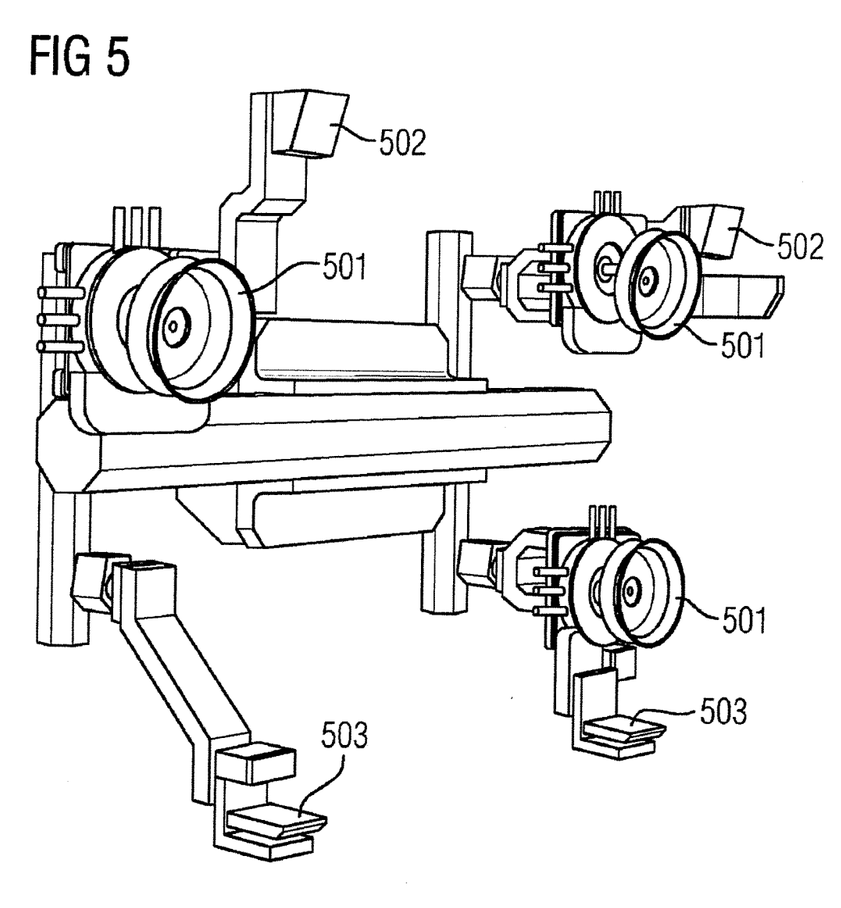
FIG. 5 shows a positioning device for picking up add-on parts and installing the same on vehicle bodies.

The positioning device illustrated in FIG. 5 for picking up add-on parts and installing the same on vehicle bodies comprises a suction gripper unit for picking up the add-on part, where the suction gripper unit comprises a plurality of suction elements 501 that can be aligned with an outer contour of the add-on part and a plurality of supporting elements 502 and carrying elements 503. The supporting elements 502 interact with the suction elements 501 and are used to support the add-on part attracted by suction by the suction elements 501. Accordingly, the supporting elements 502 are configured such that they can be adapted to the outer contour of the add-on part. The carrying elements 503 are used to support the add-on part at the lower edge thereof and therefore also for a definition of the position of the add-on part within the suction gripper unit.

The suction gripper unit is adjustable in the vehicle longitudinal axis and in the vehicle vertical axis. With an adjustment of the suction gripper unit in the vehicle longitudinal axis and in the vehicle vertical axis, a position of the add-on part in relation to the positioning device can be defined. Preferably, the add-on part is picked up from a component storage device via the positioning device even before the installation of the add-on part hinge halves.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for installing an add-on part on a vehicle body, the method comprising:
  installing a plurality of body hinge halves on the vehicle body using a first reference point system comprising body reference points, the plurality of body hinge halves each being defined with regard to their arrangement in a longitudinal and vertical axes of the vehicle by the reference point system, and a pivot axis of the add-on part is defined by hinge holes or hinge bolts of the plurality of body hinge halves;
  measuring at least one vehicle transverse axis coordinate of the installed plurality of body hinge halves;
  installing a plurality of add-on part hinge halves on the add-on part using the first reference point system and a second reference point system comprising add-on part reference points, the add-on part hinge halves each being defined with regard to their transformed arrangement in the longitudinal and vertical axes of the vehicle by the second reference point system, at least one correction value for the add-on part hinge halves with regard to their transformed arrangement in a vehicle transverse axis being determined from the measured at least one vehicle transverse axis coordinate of the body hinge halves, and the add-on part hinge halves being installed using the determined at least one correction value;

moving the add-on part via a positioning device to a measuring position at a predefinable distance from the vehicle body, a position and orientation of hinge bolts or hinge holes of the add-on part hinge halves being determined and compared with a position and orientation of corresponding hinge holes or hinge bolts of the body hinge halves at the measuring position; and suspending the add-on part via the positioning device with its add-on part hinge halves on the body hinge halves installed on the vehicle body using a comparison result.

2. The method as claimed in claim 1, wherein the positioning device comprises a suction gripper unit for picking up the add-on part.

3. The method as claimed in claim 2, wherein the add-on part is picked-up from a component storage device via the positioning device before the installation of the add-on part hinge halves.

4. The method as claimed in claim 3, wherein the suction gripper unit is adjustable in the longitudinal and vertical axis of the vehicle; and wherein the position of the add-on part in relation to the positioning device is defined by adjusting the suction gripper unit in the longitudinal and vertical axes of the vehicle.

5. The method as claimed in claim 1, wherein the body hinge halves are each installed on the vehicle body via a first screw inserted from a body inner side and a second screw subsequently inserted from a body outer side.

6. The method as claimed in claim 5, wherein the add-on part hinge halves are each mounted on the add-on part via exactly one screw.

7. The method as claimed in claim 1, wherein the body hinge halves have hinge holes, and wherein the add-on part hinge halves have hinge bolts.

8. The method as claimed in claim 7, wherein the position and orientation of the installed add-on part hinge halves at a measuring position before suspension of the add-on part on the vehicle body are each scanned via a sensor arranged adjacent the vehicle body at a height of an expected measuring position.

9. The method as claimed in claim 7, wherein the position and orientation of the installed body hinge halves are each scanned via a sensor arranged adjacent the vehicle body above an expected installation position.

10. The method as claimed in claim 9, wherein the position and orientation of the installed add-on part hinge halves at a measuring position before suspension of the add-on part on the vehicle body are each scanned via a sensor arranged adjacent the vehicle body at a height of an expected measuring position.

* * * * *